United States Patent [19]

Cleer, Jr.

[11] 4,080,701
[45] Mar. 28, 1978

[54] WATER JACKET FABRICATION

[75] Inventor: Clarence W. Cleer, Jr., Kane, Pa.

[73] Assignee: Ridgway Steel Fabricators, Inc., Ridgway, Pa.

[21] Appl. No.: 783,311

[22] Filed: Mar. 31, 1977

Related U.S. Application Data

[63] Continuation-in-part of Ser. No. 687,631, May 18, 1976, Pat. No. 4,025,043, which is a continuation-in-part of Ser. No. 495,107, Aug. 5, 1974, Pat. No. 3,958,755.

[51] Int. Cl.² .............................................. B23P 15/26
[52] U.S. Cl. ........................... 29/157.3 D; 113/118 D; 228/165; 228/173 C
[58] Field of Search .................. 29/157.3 D, 157.3 R; 113/116 QA, 118 C, 118 D, 118 V; 228/165, 178, 173 C; 126/132, 121

[56] References Cited

U.S. PATENT DOCUMENTS

| | | | |
|---|---|---|---|
| 2,550,174 | 4/1951 | Towner | 29/157.3 D X |
| 3,958,755 | 4/1976 | Cleer, Jr. | 126/132 X |
| 4,025,043 | 6/1977 | Cleer, Jr. | 126/132 X |

*Primary Examiner*—Milton S. Mehr
*Attorney, Agent, or Firm*—Cushman, Darby & Cushman

[57] ABSTRACT

A simplified method for the fabrication of a fireplace water jacket, and the water jacket produced by the fabrication method. Each of several walls of a water jacket is formed from first and second metal plates. The first metal plate of each wall is disposed in a generally horizontal position on an orificed support, and a punch is brought into operative engagement therewith to punch a hole in the plate and simultaneously deform the area surrounding the hole so that the plane of the hole is spaced a given distance as from the plane of the plate. The first plate is then placed on the second plate so that the plates are generally parallel and so that the area surrounding the hole in the first plate abuts the second plate, and then the plates are secured together by welding around the area defining the hole in the first plate to the portion of the second plate visible through the hole in the first plate. The plates when joined together are spaced apart a distance S and water may circulate between the plates. The various walls are joined together to form a water jacket having an inlet and an outlet, and preferably at least three walls are provided including two sides and a back wall. The bottom of the water jacket may be formed by a header extending between the two side walls and a plurality of water-conducting, log supporting pipes extending generally perpendicular to the header from the header to the back wall of the water jacket. The pipes are disposed at a small positive angle (1° to 2°) with respect to the horizontal.

7 Claims, 7 Drawing Figures

WATER JACKET FABRICATION

CROSS-REFERENCE TO RELATED APPLICATIONS

This application is a continuation-in-part of U.S. Ser. No. 687,631, filed May 18, 1976, and now U.S. Pat. No. 4,025,043, which in turn is a continuation-in-part of U.S. Ser. No. 495,107, filed Aug. 5, 1974, and now U.S. Pat. No. 3,958,755.

BACKGROUND AND SUMMARY OF THE INVENTION

The invention relates to the fabrication of water jackets for use with open hearth wood-burning fireplaces for circulating water around the fireplaces, and adapted to be installed with a conventional home heating system. In the past, numerous different types of water jackets have been provided, such as shown in U.S. Pat. No. 3,958,755, and the references cited therein, all of which have been relatively successful in performing their ultimate function. A large part of the expense of such jackets, however, has been the expense of fabrication thereof, and in the past, water jackets have often been fabricated by joining spaced metal plates at their ends and additionally by providing a plurality of plugs between spaced metal plates welded to the plates to maintain proper spacing between the plates in order that the plates are able to withstand the operating pressures encountered. Conventionally, a hole has been punched in one of two plates, a plug welded to the other of the two plates, and the plate with the hole in it placed over the plug and welded to the plug. While such a structure does properly accomplish the desired end result of allowing the water jacket to withstand sufficiently high temperatures and pressures, the fabrication technique requires the formation of two separate welds, and requires the utilization of a plurality of plug numbers.

According to the present invention, the conventional prior art method of water jacket fabrication has been improved by elimination of the plug members conventionally used for spacing the plates and by elimination of one of the welds necessary to affix the plug member in place. According to the present invention, first and second plates are joined together at middle portions thereof; the first metal plate is disposed in a generally horizontal position over an orificed support, and a punching tool is brought into operative engagement with the plate to punch a hole in the plate and simultaneously deform the area around the hole so that the plane of the hole is spaced a given distance S from the plane of the plate. The orificed support preferably comprises a female die portion spaced a distance S' (greater than S) from the plane of the first plate, and during punching and simultaneous deformation the hole is spaced a distance S' from the plane of the first plate with the area around the hole rebounding after removal of the punch. The first plate is then disposed on the second plate so that the plates are generally parallel and so that the area surrounding the hole in the first plate abuts the second plate, and then the plates are joined together spaced apart the distance S by welding around the area defining the hole in the first plate to the portion of the second plate visible through the hole in the first plate. The first and second plates are then joined together with other similar plates to form a water tight water jacket for surrounding an open hearth wood burning fireplace, a water inlet and a water outlet being provided for the water jacket. Preferably, the water jacket includes at least three walls including two side walls and a back wall, and a bottom is provided for the water jacket comprising a header connected between the two side walls and a plurality of wood supporting water conducting pipes extending between the header and the back wall substantially perpendicular to the header, each of the pipes making a small positive angle α of about 1° to 2° with respect to the horizontal. The header may comprise a prism having a triangular base, which header may be formed by bending a metal plate to form two legs of the triangular base prism, forming a plurality of holes in a straight plate member, attaching the straight plate member to the legs defined by the bent plate, and attaching the pipes in said holes in the straight plate member. The invention includes both the method of fabrication of the water jacket as well as the water jacket constructed according to the method of the invention.

It is a primary object of the present invention to provide an improved fabrication of a fireplace water jacket which is capable of withstanding high pressures of operation. This and other objects of the invention will become clear from an inspection of the detailed description of the invention and from the appended claims.

DETAILED DESCRIPTION OF THE INVENTION

Figure 1:
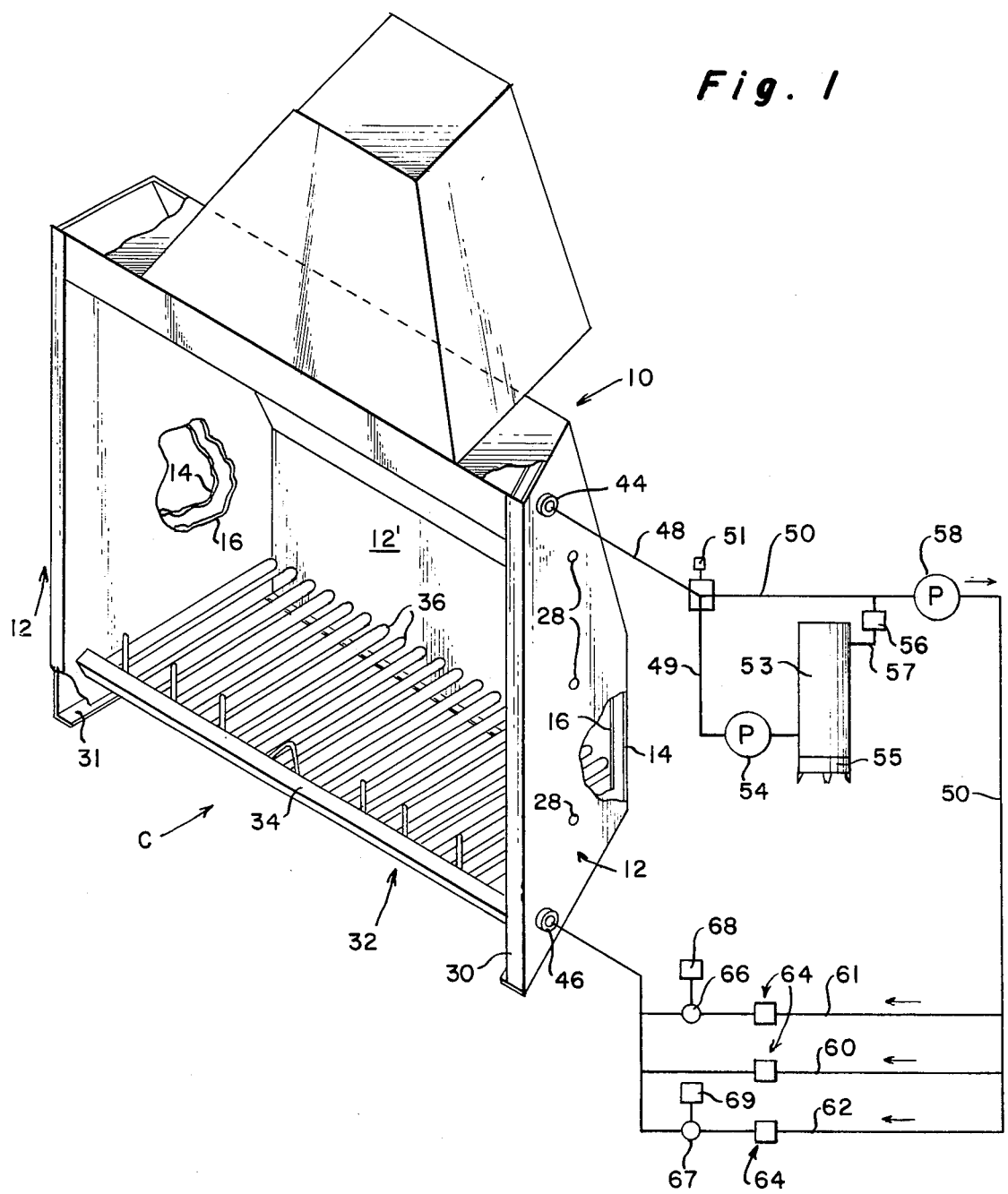
FIG. 1 is a perspective view of an exemplary water jacket according to the present invention shown schematically hooked up to a home heating system.

An exemplary water jacket for an open hearth wood burning fireplace according to the present invention is shown at 10 in FIG. 1. The water jacket preferably comprises a plurality of walls including a pair of side walls 12 and a back wall 12'. Each one of the walls 12, 12' is formed by a first metal plate 14 spaced from a second metal plate 16 to provide a water conducting area therebetween. It is necessary to fabricate the walls 12, 12' so that they can withstand the pressures that will be reached in an emergency situation wherein water would not be circulating through the water jacket 10 but rather would be merely contained therein and still subjected to a fire burning in the chamber c defined by the water jacket 10.

Figure 2A:
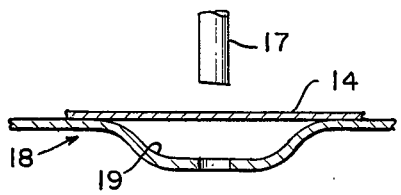
FIGS. 2a through 2d are diagrammatic views showing consecutive method steps employed in the fabrication of the water jacket of FIG. 1.
Figure 2B:
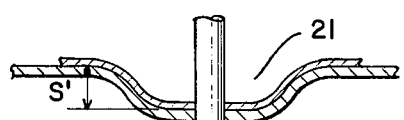
Figure 2C:
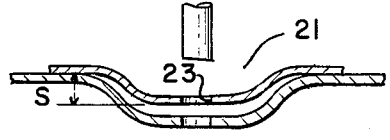

The fabrication of each of the walls 12, 12' of the water jacket 10 according to the invention is effected by using a punch 17 and an orificed support 18. Preferably, the orificed support 18 includes a female die portion 19. A first metal plate 14 is disposed generally horizontally on orificed support 18 (see FIG. 2a), and the punch 17 is brought into operative engagement with the plate 14 to punch a hole 23 in the plate and simultaneously deform the area 21 surrounding the hole 23 so that the plane of the hole is spaced a given distance S from the plane of the plate (see FIG. 2c). Preferably, the punch 17 will cause the plate 14 to come into contact with the female die portion 19 of the orificed support 18, which female die portion 19 is spaced a distance S' from the plane of the plate 14, S' being greater than S. During the punching and simultaneously deformation, the area 21 is initially deformed so that the plane of the hole 23 is spaced a distance S' from the plane of the plate 14 (see FIG. 2b), however, the area 21 rebounds after removal of the punch 17 (see FIG. 2c) so that the plane of the hole 23 is spaced a distance S from the plane of the plate after removal of the punch. While the distance S may be chosen to be any distance that provides for a proper volume of water to be circulated around the fire and a proper rate of water flow, it is preferred that the distance S be about one half inch.

Figure 2D:
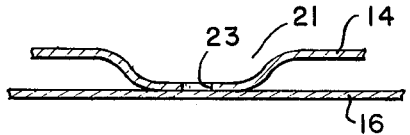
Figure 3:
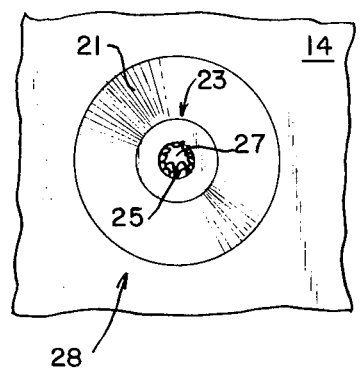
FIG. 3 is a top plan view of the connection between two spaced walls of the water jacket of FIG. 1.

After the hole 23 is formed in the first plate 14, the first and second plate 14, 16 are joined together so that they are generally parallel to each other. The first plate 14 is disposed on the second plate 16 (see FIG. 2d) so that the plates are generally parallel and so that the area 21 surrounding the hole 23 in the first plate abuts the second plate 16. The plates are joined by welding the area defining the hole 23 in the first plate 14 to the portion 27 of the second plate 16 visible through the hole 23 in the first plate (see FIG. 3). The weld is made completely around the perimeter of the hole 23 to join the plates 14 and 16 together in water tight relationship; such a weld is shown at 25 in FIG. 3. The resultant structure comprises means for attaching the first and second plates together shown generally at 28 in FIGS. 1 and 3.

After the plates 14, 16 are joined together, a plurality of the attaching means 28 being provided between each plate depending upon the size of the plates and the pressures to be reached within the water jacket, the walls 12, and 12' are joined together to form the water jacket 10. Side portions 30 and other joining portions 31 are provided for joining each set of plates 14, 16 together around the periphery of the water jacket 10, such portions 30, 31 preferably being attached to the plates 14, 16 respectively by welding. The side walls 12 are welded to the back wall 12' also to provide a water tight jacket for circulation of water around the fire in chamber C. Of course, other wall portions may also be provided for the water jacket.

Figure 4:
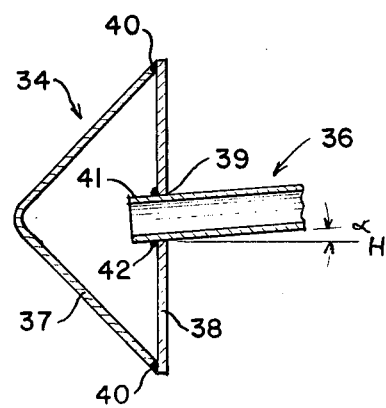
FIG. 4 is a cross-sectional detailed view of an exemplary header for use in the water jacket of FIG. 1.

The formation of a bottom 32 of the water jacket 10 preferably is provided by disposing a header 34 between the two side walls 12 of the water jacket 10 and by providing a plurality of wood supporting water conducting pipes 36 extending between the header 34 and the back wall 12' substantially perpendicular to the header 34, each of the pipes 36 making a small positive angle $\alpha$ (FIG. 4) with respect to the horizontal H. Although the angle $\alpha$ is shown magnified in FIG. 4 for clarity, preferably the angle is smaller than that illustrated, about 1° to 2°.

The header 34 preferably comprises a prism having a triangular base, the header 34 being formed by bending a metal plate 37 to form two legs of the triangular base prism, forming a plurality of holes 39 in a straight plate member 38, attaching the straight plate member 38 to the two legs defined by the bent plate 37 as by welding at points 40, and attaching the pipes 36 in the holes 39 in the straight plate member 38. The attachment of the pipes 36 in the holes 39 of the plate member 38 is accomplished by passing each of the pipes 36 through a respective opening 39 so that it extends outwardly from the plane of the straight plate member 38 — as shown at 41 in FIG. 4 — and welding each pipe 36 to the plate 38 around each opening as at 42. The header 34 according to the present invention is constructed so that it may be manufactured in the least expensive way possible, the header 34 may be readily formed by a stamping operation with an automatic tube welder and the straight plate member 38 may be punched and connected up to the bent plate member 37 after the pipes 36 are connected thereto. A structurally sound, water tight structure is readily constructed in an inexpensive manner from commonly existing materials according to the invention. The pipes 36 are disposed at the small positive angle $\alpha$ in order to eliminate a "pinging" sound by creating a convectional force as the water circulates through the pipes 36, which "pinging" sound would be created were the pipes 36 to be disposed horizontally.

The water jacket 10 according to the present invention is adapted for conventional operation at 12 to 20 psi, although it is capable of operation at much higher pressures due to the utilization of the attaching means 28 in the formation of the jacket 10. For safety, however, it is desirable to provide a pressure relief valve for the jacket, such as one adapted to vent at 30 psi.

The water jacket 10 has a water inlet 46 and a water outlet 44 located vertically above the inlet 46, the water circulating through the header 34, pipes 36, back 12', and sides 12 and passing from the inlet 46 to the outlet 44. Another outlet (not shown) may be located in the same respective position as the outlet 44 but on the opposite side of the water jacket 10 in place of the outlet 44 if a cross-flow is desired in the jacket 10. Preferably, the jacket 10 is disposed in operative relationship with a conventional home heating system and/or hot water heating system. The hook up shown in FIG. 1 is substantially the same as the hook-up shown in FIG. 9 in parent application Ser. No. 687,631, however, this is shown only for the purposes of illustration and the jacket 10 may be placed in any type of heating system such as a forced air system, solar heating system, or the like. Water flowing from outlet 46 flows through a pipe 48 to a branch at lines 49 and 50. A vent 51 is provided in the line 48 for air elimination, as is conventional. The system illustrated in FIG. 1 is useful especially with a forced hot water boiler 53 equipped to also supply domestic hot water, and electric zone control. Line 49 connects to boiler 53 and pump 54 when in operation circulates water from line 49 through boiler 53. A conventional source 55 is provided for heating the water in boiler 53 when the water jacket 10 is not in use. A flow control 56 is preferably provided in the line 57 leading from boiler 53 back to line 50, and a pump 58 is provided downstream of the connection of line 57 to line 50. Typically, three loops would be connected between the line 50 and the inlet 46 such as a living area loop 60, a second story loop 61, and a basement loop 62, each loop having radiators 64 or the like disposed therein. A living area thermostat would control the boiler 53, and water would generally always be circulating through the living area loop 60 when heating is being provided by the boiler 53 and/or jacket 10. Loop 60 will be designed to have heat radiation capacity in excess of the BTU output of the jacket 10. A second story thermostat 68 operatively controls a valve 66 disposed in line 61 to selectively allow or prevent the flow of water through the loop 61, and a basement thermostat 69 controls a valve 67 to selectively allow or prevent the flow of liquid through the loop 62. No valves or restrictions are provided in the line 49 or 48.

The water jacket 10 that is fabricated according to the method of the present invention includes at least three walls 12, and 12', each of the walls comprising first and second plates 14, 16 substantially parallel but spaced from each other and means 28 for attaching the plates 14, 16 together in middle portions thereof. Means are provided for attaching the three walls 12, 12' together in water tight relationship including side and other plate members 30, 31 and welds between the various walls, to allow circulation of water around the fire place. The water inlet 44 and outlet 46 are provided in one or more of the walls, and the bottom 32 may be constructed of the header 34 and pipes 36 as described above.

It will thus be seen that according to the present invention a method for the fabrication of a water jacket for use with an open hearth, wood burning fireplace, and the water jacket so fabricated, have been provided, the water jacket being so fabricated being capable of withstanding the highest pressure attainable during operation of the fireplace and being constructed in a simple and relatively inexpensive manner. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent methods and devices.

I claim:

1. A method of fabricating a water jacket having spaced-apart walls utilizing a punch and an orificed support cooperating with the punch comprising the steps of:
   (a) disposing a first metal plate generally horizontally on said orificed support,
   (b) bringing said punch into operative engagement with said first metal plate to punch a hole in said plate and simultaneously deform the area surrounding said hole so that the plane of said hole is spaced a given distance S from the plane of said plate,
   (c) disposing said first plate on a second plate so that said plates are generally parallel and so that the area surrounding said hole in said first plate abuts said second plate,
   (d) joining said first plate to said second plate so that said plates are spaced apart a distance S by welding the area defining the hole in said first plate to the portion of said second plate visible through said hole in said first plate,
   (e) forming said first and second welded together metal plates into a water jacket for surrounding an open-hearth wood-burning fireplace adapted to have an open fire therein, and
   (f) forming a water inlet to said water jacket and a water outlet from said water jacket to provide for circulation of water around a fire burning in said fireplace, including circulating water between said first and second metal plates.

2. A method as recited in claim 1 wherein said step of bringing said punch into operative engagement with said first plate to punch a hole in said plate is effected to space the plane of said plate from the plane of said hole a distance S equal to about one half inch.

3. A method as recited in claim 1 wherein said orificed support comprises a female die portion, and wherein said female die portion is spaced a distance S' from said first plate greater than S, and wherein said step of punching a hole in said plate and simultaneously deforming the area around the hole is accomplished by causing deformation of said area so that said area is initially deformed so that the plane of said hole is spaced said distance S' from the plane of said first plate, said area rebounding after removal of said punch so that the plane of said hole is spaced said distance S from the plane of said plate after removal of said punch.

4. A method as recited in claim 1 comprising the further step of forming a plurality of holes in said first plate by bringing said punch into operative engagement therewith at spaced points as in step (b), and welding said first plate to said second plate at each of said plurality of orifices as recited in step (d), and comprising the further step of repeating steps (a)-(d) to form at least two more sets of said first and second plates, and wherein step (e) is accomplished by welding said at least three sets of first and second plates together to form a water-tight water jacket, including two side walls and a back wall.

5. A method as recited in claim 4 comprising the further step of forming a bottom for said water jacket by disposing a header connected between said two side walls of said water jacket and providing a plurality of wood-supporting water conducting pipes extending between said header and said back wall substantially perpendicular to said header, each of said pipes making a small positive angle $\alpha$ with respect to the horizontal.

6. A method as recited in claim 5 wherein said header comprises a prism having a triangular base, and wherein said header is formed by bending a metal plate to form two legs of the triangular base prism, forming a plurality of holes in a straight plate member, attaching said straight plate member to said two legs defined by said bent plate, and attaching said pipes in said holes in said straight plate member.

7. A method as recited in claim 6 wherein said step of attaching said straight plate member to said bent plate legs is accomplished by welding, and wherein said step of attaching said pipes in said holes of said straight plate member is accomplished by passing each of said pipes through a respective opening so that it extends outwardly of the plane of said straight plate member, and welding each said pipes to said straight plate member around each said opening.

* * * * *